United States Patent
Marupaduga et al.

(10) Patent No.: US 11,419,125 B1
(45) Date of Patent: Aug. 16, 2022

(54) MITIGATING INTERFERENCE IN MASSIVE MIMO WIRELESS NETWORKS

(71) Applicant: SPRINT SPECTRUM LP, Overland Park, KS (US)

(72) Inventors: Sreekar Marupaduga, Overland Park, KS (US); Rajveen Narendran, Olathe, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 0 days.

(21) Appl. No.: 16/294,033

(22) Filed: Mar. 6, 2019

(51) Int. Cl.
*H04W 72/08* (2009.01)
*H04B 7/0452* (2017.01)
*H04W 16/28* (2009.01)
*H04B 7/0456* (2017.01)
*H04W 24/10* (2009.01)
*H04B 17/345* (2015.01)

(52) U.S. Cl.
CPC .......... *H04W 72/082* (2013.01); *H04B 7/046* (2013.01); *H04B 7/0452* (2013.01); *H04B 17/345* (2015.01); *H04W 16/28* (2013.01); *H04W 24/10* (2013.01)

(58) Field of Classification Search
CPC ... H04W 72/082; H04W 16/28; H04W 24/10; H04B 17/345; H04B 7/0452; H04B 7/046
See application file for complete search history.

(56) References Cited

U.S. PATENT DOCUMENTS

| | | | |
|---|---|---|---|
| 10,588,089 B1* | 3/2020 | Raghavan | H04W 52/42 |
| 2012/0099450 A1* | 4/2012 | Madan | H04W 74/0816 |
| | | | 370/252 |
| 2012/0315935 A1* | 12/2012 | Wang Helmersson | |
| | | | H04W 16/14 |
| | | | 455/501 |
| 2017/0093466 A1* | 3/2017 | Nieman | H04L 25/0202 |
| 2017/0331670 A1* | 11/2017 | Parkvall | H04L 41/0233 |
| 2018/0352461 A1* | 12/2018 | Guirguis | H04B 17/336 |

* cited by examiner

*Primary Examiner* — Elton Williams

(57) ABSTRACT

Systems for mitigating interference in a massive MIMO wireless network include an access node, a plurality of antennae communicatively coupled to the access node, and a processor communicatively coupled to the access node. The processor can be configured to perform operations including communicating with one or more wireless devices within a wireless sector utilizing one or more antennae from the plurality of antennae, and monitoring an interference level within the wireless sector. Upon the interference level meeting a threshold, the processor may be configured to utilize fewer antennae to communicate with the one or more wireless devices. Conversely, upon the interference level not meeting the threshold, the processor may be configured to utilize more antennae to communicate with the one or more wireless devices.

15 Claims, 4 Drawing Sheets

MITIGATING INTERFERENCE IN MASSIVE MIMO WIRELESS NETWORKS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. In a recent evolution of MIMO technology, known as massive MIMO or large-scale MIMO, an access node may utilize hundreds of antennae to simultaneously transmit each of a plurality of different data streams to a corresponding plurality of wireless devices. Massive MIMO has been identified as one of the promising air interface technologies to address the massive capacity requirement required demanded by 5G networks. However, the increased numbers of transmit and receive antennae utilized in massive MIMO networks may result in increased interfering signals, thereby compromising a throughput for a given wireless sector. Conversely, disabling the massive MIMO transmission modes (i.e. high-volume data stream at high throughput for wireless devices) can cause inefficiencies and waste of resources. Thus, there remain antenna configuration problems in existing wireless networks configured to utilize massive MIMO.

Overview

Exemplary embodiments described herein include methods, systems, and processing nodes for mitigating interference in massive MIMO wireless networks. An exemplary method for mitigating interference in a massive MIMO wireless network includes determining that an interference level of a wireless sector served by an access node meets a threshold, and instructing the access node to reduce a number of antennae operating within the wireless sector.

An exemplary system for mitigating interference in a massive MIMO wireless network includes an access node, a plurality of antennae communicatively coupled to the access node, and a processor communicatively coupled to the access node. The processor can be configured to perform operations including communicating with one or more wireless devices within a wireless sector utilizing one or more antennae from the plurality of antennae, and monitoring an interference level within the wireless sector. Upon the interference level meeting a threshold, the processor may be configured to utilize fewer antennae to communicate with the one or more wireless devices. Conversely, upon the interference level not meeting the threshold, the processor may be configured to utilize more antennae to communicate with the one or more wireless devices.

An exemplary processing node for mitigating interference in a massive MIMO wireless network is configured to perform operations including monitoring an interference level within a wireless sector served by a plurality of antennae coupled to an access node. The access node can be configured to communicate with one or more wireless devices within the wireless sector via a first number of antennae from the plurality of antennae. The processing node can further be configured to determine that the interference level meets a threshold and, responsive to the interference level meeting the threshold, instructing the access node to communicate with the one or more wireless devices via a second number of antennae from the plurality of antennae, the second number being smaller than the first.

DETAILED DESCRIPTION

Figure 1:
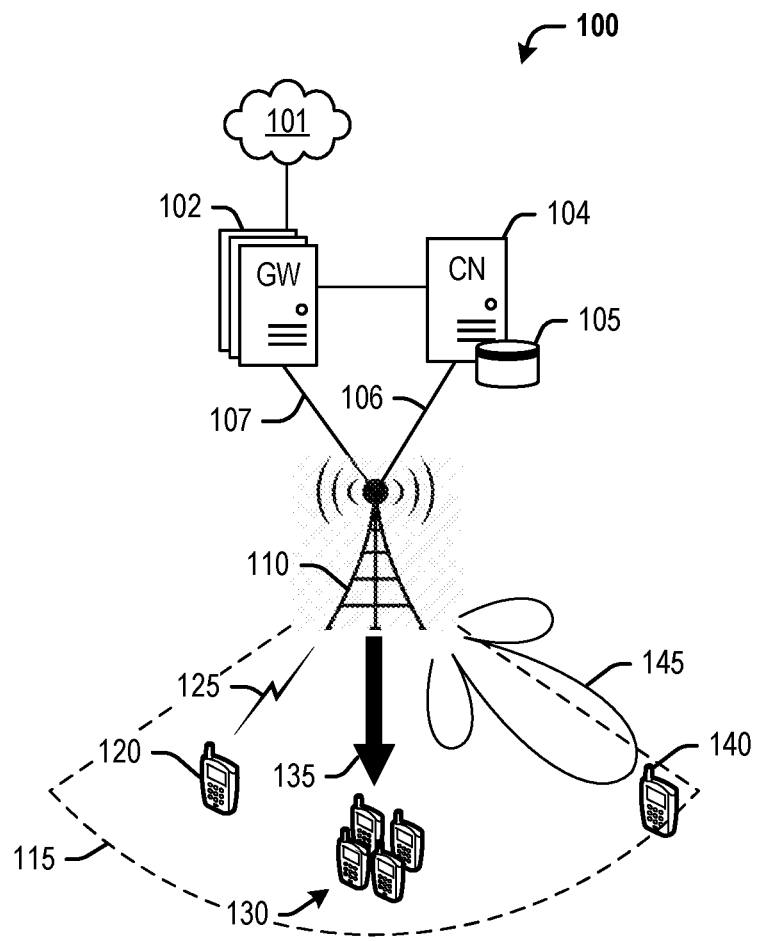
FIG. 1 depicts an exemplary system for mitigating interference in a massive MIMO wireless network.

In embodiments disclosed herein, a method for mitigating interference in a massive multi-user multiple-input multiple-output (MIMO) wireless network includes determining that an interference level of a wireless sector served by an access node meets a threshold, and instructing the access node to reduce a number of antennae operating within the wireless sector. The access node may be communicatively coupled to an antenna array comprising a plurality of antennae. The access node may further be configured to communicate with one or more wireless devices within the wireless sector via a first number of antennae from among the plurality of antennae. Instructing the access node to reduce the number of antennae can include instructing the access node to communicate with the one or more wireless devices within the wireless sector via a second number of antennae from among the plurality of antennae, the second number being smaller than the first. For example, the first number of antennae can include 64 transmit antennae and 64 receive antennae (64T64R), and the second (i.e. reduced) number of antennae can include 32 transmit antennae and 32 receive antennae (32T32R). In further exemplary embodiments, the reduced number of antennae can include 16 transmit antennae and 16 receive antennae (16T16R), or 8 transmit antennae and 8 receive antennae (8T8R). Other combinations of transmit and receive antennae are possible, including numbers above 64, and numbers below 8, as well as different number of each of transmit and receive antennae. Thus, in light of this disclosure, one or ordinary skill in the art would understand that the first number can be any one of 64T64R, 32T32R, 16T16R, or 8T8R (and combinations thereof), and the second number can be any number of transmit or receive antennae that is smaller than the first number. Such reconfiguration of antennae may be performed by activating and deactivating physical antenna, reconfiguring logical antenna ports, etc.

The method further includes monitoring the interference level in the wireless sector. For example, monitoring the interference level in the wireless sector can include obtaining a gain level associated with the first number of antennae. The gain level may be obtained by receiving a measurement report from at least one of the one or more wireless devices in the wireless sector. For example, utilizing a certain number of antennae (e.g. 64T64R) may be associated with an expected gain level of a signal transmitted therefrom, whereas an actual gain level of the signal as received at a wireless device may be lower due to interference or other signal conditions. In an exemplary embodiment, an expected gain may be +9 dB and an actual gain may be +3 dB due to interference, etc. Thus, gain levels based on reports from one or more wireless devices within a wireless sector may be used to determine an interference level within the wireless sector. The interference level is compared with a threshold and, if the interference level rises to meet the threshold, the access node is instructed to reduce the number of antennae. Alternatively or in addition, comparing the interference level to a threshold may be based on comparing the gain level to a gain threshold, and determining that the interference meets the threshold may be based on determining that the gain level falls below a gain threshold. Further, if the interference level does not meet the threshold (or if the gain stays above a gain threshold) then the access node may be instructed to maintain the number of antennae operating within the wireless sector or to increase the number of antennae operating within the wireless sector.

In further exemplary embodiments illustrated herein, a system for mitigating interference in a massive MIMO wireless network includes an access node, a plurality of antennae communicatively coupled to the access node, and a processor communicatively coupled to the access node. The processor can be configured to perform operations including communicating with one or more wireless devices within a wireless sector utilizing one or more antennae from the plurality of antennae, and monitoring an interference level within the wireless sector. Upon the interference level meeting a threshold, the processor may be configured to utilize fewer antennae to communicate with the one or more wireless devices. Conversely, upon the interference level not meeting the threshold, the processor may be configured to utilize more antennae to communicate with the one or more wireless devices. As in the previous embodiment, a maximum number of antennae may include 64T64R, and utilizing fewer antennae to communicate with the one or more wireless devices can include utilizing any one of 32T32R, 16T16R, or 8T8R, in any combination of transmit and receive configurations. In exemplary embodiments, the maximum number may comprise any other number than 64T64R, such as 32T32R, 16T16R, etc.

In further embodiments, a processing node for mitigating interference in a massive MIMO wireless network is configured to perform operations including monitoring an interference level within a wireless sector served by a plurality of antennae coupled to an access node. The access node can be configured to communicate with one or more wireless devices within the wireless sector via a first number of antennae from the plurality of antennae. The processing node can further be configured to determine that the interference level meets a threshold and, responsive to the interference level meeting the threshold, instructing the access node to communicate with the one or more wireless devices via a second number of antennae from the plurality of antennae, the second number being smaller than the first.

Further, the above operations may be performed within a time period. The time period is configurable, in that it can be adjusted by an operator of the wireless network, or by an automated feedback mechanism. For example, the interference determination and antenna reconfiguration may be performed at defined time intervals such as every transmission-time-interval (TTI), every 10 ms, every 1 s, etc. Further, the time period can be adjusted based on a throughput indicator of the wireless sector. For example, if the throughput indicator meets a threshold, the time period is increased and, if the throughput indicator does not meet the threshold, the time period is decreased. The throughput indicator comprises any metric that indicates that there are available resources in the wireless sector, or that an available throughput of the wireless sector is very good. For example, the throughput indicator comprises one or more of a total throughput, an available throughput, a resource usage, average bandwidth consumption, or any other key performance indicator (KPI). Thus, when the throughput indicator reveals that the throughput is good (by, for example, meeting a threshold), the time period may be increased. These and additional operations are further described with respect to the embodiments depicted in FIGS. 1-5 below.

FIG. 1 depicts an exemplary system for mitigating interference in a massive multi-user multiple-input multiple-output (MIMO) wireless network. System 100 comprises a communication network 101, gateway node(s) 102, controller node 104, access node 110, and wireless devices 120, 130, 140. Access node 110 is illustrated as deploying a wireless sector 115, with wireless devices 120, 130, 140 being located within wireless sector 115 and accessing network services from access node 110. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement various transmission pathways, including a standard transmission 125 (which can include a single-user MIMO transmission), a multi-user multiple-input-multiple-output (MU-MIMO) transmission 135, and a beamformed transmission 145. In an exemplary embodiment, access node 110 may utilize a plurality of antennae, e.g. 64 transmit antennae and 64 receive antennae (64T64R), to simultaneously transmit multiples of each type of transmission over wireless sector 115 and other wireless sectors within a coverage area of access node 110. For example, one or more antennae from a plurality of antennae coupled to access node 110 may be configured to serve wireless devices 120, 130, 140 within the wireless sector 115, and a subset of the one or more antennae may be configured to form each separate transmission 125, 125, 145. Moreover, it is noted that while access node 110 and wireless devices 120, 130, 140 are is illustrated in FIG. 1, any number of access nodes can be implemented within system 100.

However, as described above, utilizing a large number of antennae within a wireless sector can cause undesirable interference within the wireless sector. Therefore, access node 110 (or any other entity within system 100) may be configured to mitigate interference by determining that an interference level of wireless sector 115 meets a threshold, and reducing a number of antennae operating within the wireless sector. Reducing the number of antennae can include communicating with the one or more wireless devices 120, 130, 140 within the wireless sector 115 via a recued number of antennae from among the plurality of antennae. For example, if the access node is initially configured to utilize all available antennae assigned to the wireless sector 115, i.e. 64T64R, the reduced number of antennae can include 32T32R, 16T16R, or 8T8R. Further, the reduced number can include different numbers of each of transmit and receive antennae, such as 32T64R, 64T32R, 16T32R, 32T16R, etc. Other combinations of transmit and receive antennae are possible, including numbers above 64, and numbers below 8. Such reconfiguration of antennae may be performed by activating and deactivating physical antenna, reconfiguring logical antenna ports, etc.

Determination of the number of antennae to use may be based on monitoring the interference level in the wireless sector 115. For example, monitoring the interference level in the wireless sector 115 can include obtaining a gain level associated with a first number of antennae utilized by access node 110. The gain level may be obtained by receiving a measurement report from at least one of wireless devices 120, 130, 140 in the wireless sector 115. For example, utilizing a certain number of antennae (e.g. 64T64R) may be associated with an expected gain level of a signal transmitted therefrom, whereas an actual gain level of the signal as received at a wireless device 12, 130, 140 may be lower due to interference or other signal conditions. In an exemplary embodiment, an expected gain may be +9 dB and an actual gain may be +3 dB due to interference, etc. Thus, reports may be received at access node 110 from one or more wireless devices 120, 130, 140 within wireless sector 115, and may be used to determine an interference level within the wireless sector 115. The interference level is compared with a threshold and, if the interference level rises to meet the threshold, the access node 110 is instructed to reduce the number of antennae utilized to serve wireless sector 115. Alternatively or in addition, comparing the interference level to a threshold may be based on comparing the gain level to a gain threshold, and determining that the interference meets the threshold may be based on determining that the gain level falls below a gain threshold. Further, if the interference level does not meet the threshold (or if the gain stays above a gain threshold) then the access node 110 may be instructed to maintain the number of antennae operating within the wireless sector 115 or to increase the number of antennae operating within the wireless sector 115.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to antenna configurations of access node 110, capabilities of wireless devices 120, 130, 140, including MU-MIMO capabilities, real-time and/or historic information related to throughput of access node 110, interference of wireless sector 115, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
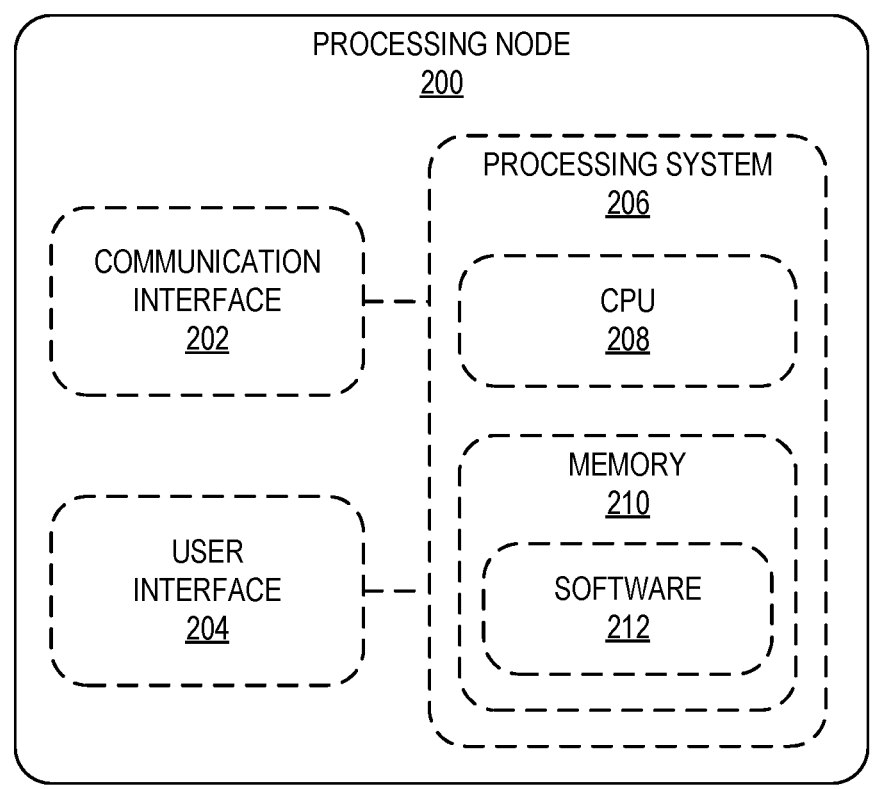
FIG. 2 depicts an exemplary processing node for mitigating interference in a massive MIMO wireless network.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
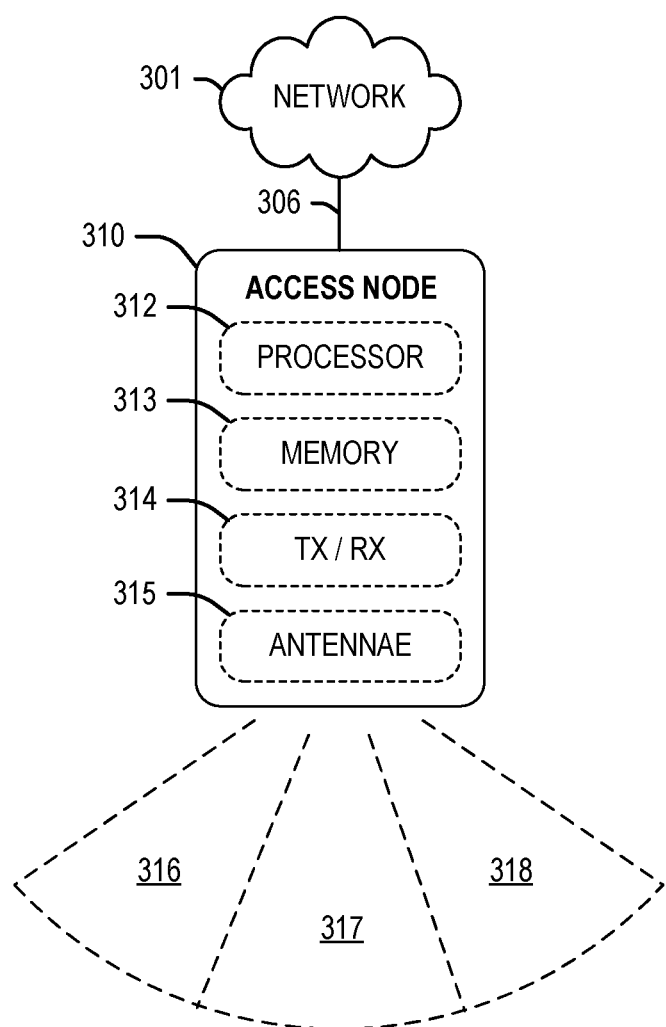
FIG. 3 depicts an exemplary access node for mitigating interference in a massive MIMO wireless network.

FIG. 3 depicts an exemplary access node 310. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Antennae 315 may comprise an array comprising a plurality of antennae, including transmit and receive antennae. Combination of antennae 315 and transceiver 314 are configured to deploy a radio air interface in one or more wireless sectors 316, 317, 318. For example, a first plurality of antennae 315 are configured to deploy a first wireless sector 316 (within which a corresponding MU-MIMO stream may further be deployed using techniques such as, for example, beamforming, etc.), a second plurality of antennae 315 are configured to deploy a second wireless sector 317, and a third plurality of antennae 315 are configured to deploy a third wireless sector 318. Antennae 315 may comprise 64T64R, 32T32R, 16T16R, etc. Although only one transceiver is depicted in access node 310, additional transceivers may be incorporated in order to deploy MU-MIMO or massive MU-MIMO data streams to end-user wireless devices in wireless sectors 316, 317, 318, as well as to facilitate communication with other network nodes on network 301. Further, access node 310 is communicatively coupled to network 301 via communication interface 306, which may be any wired or wireless link as described above.

Figure 4:
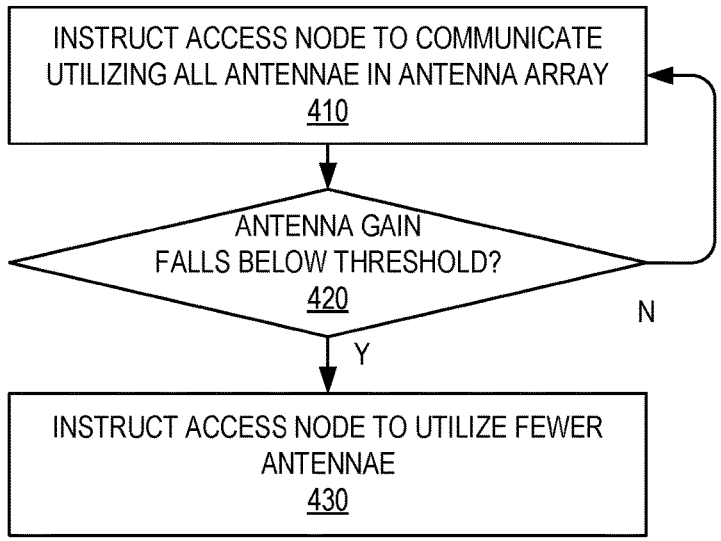
FIG. 4 depicts an exemplary method for mitigating interference in a massive MIMO wireless network.

In operation, memory 313 comprises one or more logical modules that are executed by processor 312 to FIG. 4 depicts an exemplary method for mitigating interference in massive MIMO wireless networks. The method of FIG. 4 is illustrated with respect to an access node, such as access node 110, 310. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, an access node is instructed (or configured) to communicate with one or more wireless devices within a wireless sector utilizing all available antennae coupled to the access node, or assigned to said wireless sector. For example, an access node may be communicatively coupled to an antenna array comprising a plurality of antennae. The access node may further be configured to communicate with one or more wireless devices within the wireless sector via a first number of antennae from among the plurality of antennae. In an exemplary embodiment, the number of antennae assigned to the wireless sector comprises 64T64R.

At 420, it is determined that an antenna gain falls below a threshold. For example, a gain level associated with the first number of antennae is obtained by receiving a measurement report from at least one of the one or more wireless devices in the wireless sector. Utilizing a certain number of antennae (e.g. 64T64R) may be associated with an expected gain level of a signal transmitted therefrom, whereas an actual gain level of the signal as received at a wireless device may be lower due to interference or other signal conditions. In an exemplary embodiment, an expected gain may be +9 dB and an actual gain may be +3 dB due to interference, etc. Thus, gain levels based on reports from one or more wireless devices within a wireless sector may be used to determine an interference level within the wireless sector. The interference level is compared with a threshold and, if the interference level rises to meet the threshold, then at 430, the access node is instructed to reduce the number of antennae.

Instructing the access node to reduce the number of antennae can include instructing the access node to communicate with the one or more wireless devices within the wireless sector via a second number of antennae from among the plurality of antennae, the second number being smaller than the first. For example, the first number of antennae can include 64 transmit antennae and 64 receive antennae (64T64R), and the second (i.e. reduced) number of antennae can include 32 transmit antennae and 32 receive antennae (32T32R). In further exemplary embodiments, the reduced number of antennae can include 16 transmit antennae and 16 receive antennae (16T16R), or 8 transmit antennae and 8 receive antennae (8T8R). Other combinations of transmit and receive antennae are possible, including numbers above 64, and numbers below 8, as well as different number of each of transmit and receive antennae. Thus, in light of this disclosure, one or ordinary skill in the art would understand that the first number can be any one of 64T64R, 32T32R, 16T16R, or 8T8R (and combinations thereof), and the second number can be any number of transmit or receive antennae that is smaller than the first number. Such reconfiguration of antennae may be performed by activating and deactivating physical antenna, reconfiguring logical antenna ports, etc.

Figure 5:
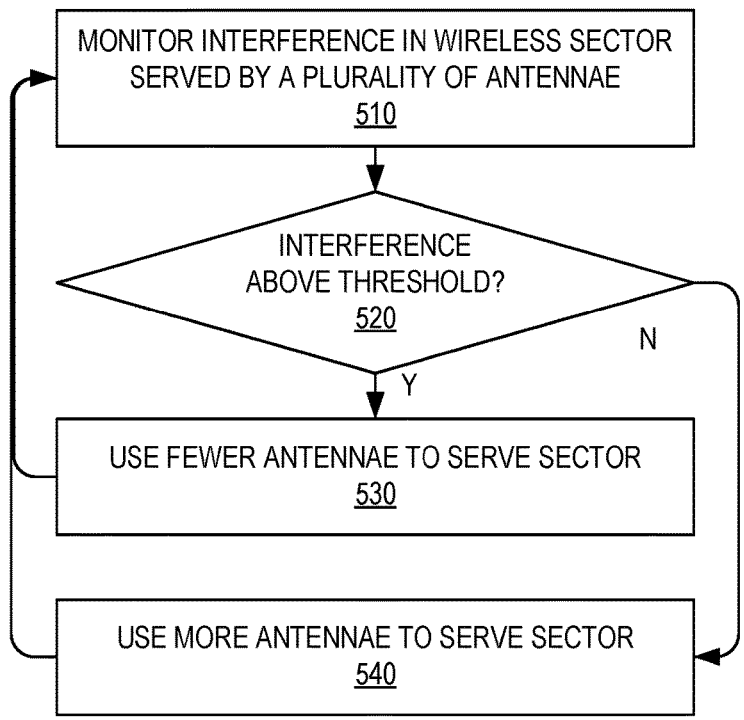
FIG. 5 depicts another exemplary method for mitigating interference in a massive MIMO wireless network.

FIG. 5 depicts another exemplary method for mitigating interference in massive MIMO wireless networks. The method of FIG. 5 is illustrated with respect to an access node, such as access node 110, 310. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, an interference is monitored of a wireless sector served by a plurality of antennae coupled to an access node. For example, an access node may be communicatively coupled to an antenna array comprising a plurality of antennae. The access node may further be configured to communicate with one or more wireless devices within the wireless sector via a first number of antennae from among the plurality of antennae. In an exemplary embodiment, the number of antennae assigned to the wireless sector comprises 64T64R, and the access node is configured to utilize 32T32R. Monitoring the interference level in the wireless sector can include obtaining a gain level associated with the first number of antennae. The gain level may be obtained by receiving a measurement report from at least one of the one or more wireless devices in the wireless sector. For example, utilizing a certain number of antennae (e.g. 64T64R) may be associated with an expected gain level of a signal transmitted therefrom, whereas an actual gain level of the signal as received at a wireless device may be lower due to interference or other signal conditions. In an exemplary embodiment, an expected gain may be +9 dB and an actual gain may be +3 dB due to interference, etc. Thus, gain levels based on reports from one or more wireless devices within a wireless sector may be used to determine an interference level within the wireless sector.

At 520, the interference level is compared with a threshold. Comparing the interference level to a threshold may be based on comparing the gain level to a gain threshold, and determining that the interference meets the threshold may be based on determining that the gain level falls below a gain threshold. If the interference level rises to meet the threshold, then at 530, the access node is instructed to reduce the number of antennae serving the wireless sector. For example, given the initial 32T32R configuration, the reduced number of antennae can include 16 transmit antennae and 16 receive antennae (16T16R), or 8 transmit antennae and 8 receive antennae (8T8R). Further, if the interference level does not meet the threshold (or if the gain stays above a gain threshold) then at 540, the access node may be instructed to maintain the number of antennae operating within the wireless sector or to increase the number of antennae operating within the wireless sector. For example, given the initial 32T32R configuration, the increased number of antennae can include 64T64R. Other combinations of transmit and receive antennae are possible, including numbers above 64, and numbers below 8, as well as different number of each of transmit and receive antennae. Thus, in light of this disclosure, one or ordinary skill in the art would understand that the first number can be any one of 64T64R, 32T32R, 16T16R, or 8T8R (and combinations thereof). Such reconfiguration of antennae may be performed by activating and deactivating physical antenna, reconfiguring logical antenna ports, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating interference in a massive multi-user multiple-input multiple-output (MIMO) wireless network, the method comprising:
   receiving measurement reports from one or more wireless devices attached to an access node associated with a wireless sector;
   determining an expected gain level based on a number of antennae operating within the wireless sector;
   determining that an actual gain level from the measurement reports is lower than an expected gain level by a threshold; and
   instructing the access node to reduce the number of antennae operating within the wireless sector.

2. The method of claim 1, wherein:
   the number of antennae is a first number of antennae; and
   the access node is configured to communicate with one or more wireless devices within the wireless sector via the first number of antennae.

3. The method of claim 2, wherein instructing the access node to reduce the number of antennae comprises instructing the access node to communicate with the one or more wireless devices within the wireless sector via a second number of antennae, the second number of antennae being smaller than the first number of antennae.

4. The method of claim 3, wherein the first number of antennae comprises 64 transmit antennae and 64 receive antennae, and the second number of antennae comprises 32 transmit antennae and 32 receive antennae.

5. The method of claim 1, wherein determining that the actual gain level is lower than an expected gain level by the threshold comprises determining that the expected gain is 9 dB and the actual gain is 3 dB.

6. The method of claim 1, further comprising:
   determining that the actual gain level is not lower than the expected gain level by the threshold; and
   instructing the access node to increase the number of antennae operating within the wireless sector.

7. A system for mitigating interference in a massive multi-user multiple-input multiple-output (MIMO) wireless network, the system comprising:
   an access node;
   a plurality of antennae communicatively coupled to the access node; and
   a processor communicatively coupled to the access node, the processor being configured to perform operations comprising:
      communicating with one or more wireless devices within a wireless sector utilizing one or more antennae from the plurality of antennae;
      receiving measurement reports from the one or more wireless devices;
      determining an expected gain level based on a number of the plurality of antennae;
      determining that an actual gain level from the measurement reports is lower than an expected gain level;
      upon a difference between the actual gain level and the expected gain level meeting a threshold, utilizing fewer antennae to communicate with the one or more wireless devices; and
      upon the difference between the actual gain level and the expected gain level not meeting the threshold, utilizing more antennae to communicate with the one or more wireless devices.

8. The system of claim 7, wherein the plurality of antennae comprises 64 transmit antennae and 64 receive antennae.

9. The system of claim 8, wherein utilizing fewer antennae to communicate with the one or more wireless devices comprises utilizing 32 transmit antennae and 32 receive antennae, 16 transmit antennae and 16 receive antennae, or 8 transmit antennae and 8 receive antennae.

10. The system of claim 7, wherein determining that the actual gain level is lower than an expected gain level by the threshold comprises determining that the expected gain is 9 dB and the actual gain is 3 dB.

11. A processing node for mitigating interference in a massive multi-user multiple-input multiple-output (MIMO) wireless network, the processing node being configured to perform operations comprising:
   receiving measurement reports from one or more wireless devices within a wireless sector served by a plurality of antennae coupled to an access node, wherein the access node is configured to communicate with the one or more wireless devices within the wireless sector via a first number of antennae from the plurality of antennae;
   determining an expected gain based on the first number of antennae;
   determining that an actual gain level from the measurement reports is lower than an expected gain level by a threshold; and
   instructing the access node to communicate with the one or more wireless devices via a second number of antennae from the plurality of antennae, the second number being less than the first number.

12. The processing node of claim 11, wherein the operations further comprise:
   determining that the actual gain level is not lower than the expected gain level by the threshold; and
   instructing the access node to communicate with the one or more wireless devices via the first number of antennae from the plurality of antennae.

13. The processing node of claim 12, wherein the plurality of antennae comprises 64 transmit antennae and 64 receive antennae.

14. The processing node of claim 13, wherein the first number comprises any one of 64 transmit antennae and 64 receive antennae, 32 transmit antennae and 32 receive antennae, or 16 transmit antennae and 16 receive antennae.

15. The processing node of claim 14, wherein the second number comprises any one of 32 transmit antennae and 32 receive antennae, 16 transmit antennae and 16 receive antennae, or 8 transmit antennae and 8 receive antennae.

\* \* \* \* \*